United States Patent
Guo et al.

(10) Patent No.: US 11,859,127 B2
(45) Date of Patent: Jan. 2, 2024

(54) CARBON DIOXIDE VISCOSIFICATION BY POLYOLEFINS

(71) Applicant: The Lubrizol Corporation, Wickliffe, OH (US)

(72) Inventors: Binbin Guo, Sagamore Hills, OH (US); Abbas Firoozabadi, Los Altos, CA (US); Mitchell M Jackson, Chagrin Falls, OH (US); Jennifer Pate, Eureka, MO (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 18/231,984

(22) Filed: Aug. 9, 2023

(65) Prior Publication Data

US 2023/0383173 A1   Nov. 30, 2023

Related U.S. Application Data

(63) Continuation of application No. 18/007,554, filed as application No. PCT/US2021/035093 on Jun. 1, 2021.

(60) Provisional application No. 63/033,237, filed on Jun. 2, 2020.

(51) Int. Cl.
*C09K 8/594* (2006.01)
*C09K 8/588* (2006.01)
*E21B 43/16* (2006.01)

(52) U.S. Cl.
CPC ............. *C09K 8/594* (2013.01); *C09K 8/588* (2013.01); *E21B 43/164* (2013.01)

(58) Field of Classification Search
None
See application file for complete search history.

(56) References Cited

U.S. PATENT DOCUMENTS

2016/0075514 A1*  3/2016  Nazarian ............. E21B 41/0064
                                                          405/59

OTHER PUBLICATIONS

Dandge, D. K., and J. P. Heller. "Polymers for Mobility Control in CO2 Floods." Paper presented at the SPE International Symposium on Oilfield Chemistry, San Antonio, Texas, Feb. 1987. doi: https://doi.org/10.2118/16271-MS (Year: 1987).*

Gu, Y., Zhang, S. & She, Y. Effects of polymers as direct CO2 thickeners on the mutual interactions between a light crude oil and CO2 . J Polym Res 20, 61 (2013). https://doi.org/10.1007/s10965-012-0061-9 (Year: 2013).*

* cited by examiner

*Primary Examiner* — Charles R Nold
(74) *Attorney, Agent, or Firm* — Vincent A. Cortese; Christopher P. Demas; Michael A. Miller

(57) ABSTRACT

A composition including a major amount of carbon dioxide and at least one branched polyolefin polymer is described, as well as methods of making and using the composition, such as in increasing the viscosity of carbon dioxide for use in carbon sequestration and/or enhanced oil recovery.

5 Claims, No Drawings

CARBON DIOXIDE VISCOSIFICATION BY POLYOLEFINS

This application is a continuation application of U.S. Ser. No. 18/007,554, filed on Dec. 1, 2022, which is national-phase filing of PCT Application No. PCT/US2021/035093, filed on Jun. 1, 2021, which claims the benefit of U.S. Provisional Application No. 63/033,237, filed on Jun. 2, 2020.

BACKGROUND OF THE INVENTION

The disclosed technology relates to a composition and method of increasing the viscosity of a carbon dioxide composition, as well as a method of increasing the sequestration carbon dioxide as well as production and recovery of hydrocarbons from an underground formation employing the viscosified carbon dioxide composition.

There are many efforts to capture and store atmospheric carbon dioxide, generally in underground geologic formations, referred to as geologic carbon sequestration. Geologic carbon sequestration faces certain issues, including the potential for the compressed supercritical carbon dioxide to escape the formation. The process of carbon dioxide sequestration from oil and gas production, the usage in fossil fuel-fired electric power facilities and other stationary sources is an essential part of humanities efforts to reduce greenhouse gas emissions. Governmental policies may mandate carbon dioxide sequestration in geologic repositories in the near future. These repositories include active and depleted oil and gas wells, saline aquifers, salt domes, and deep un-mineable coal deposits. Continuous supercritical carbon dioxide injection tends to be problematic due to unfavorable mobility, viscous fingering/channeling and early breakthrough of carbon dioxide, especially in the presence of reservoir heterogeneities. Reservoirs modeling of supercritical carbon dioxide shows that the non-uniform distribution of carbon dioxide injection into the formation has negative effect on the overall usage of the storage capacities. Furthermore, unfavorable mobility can cause unwanted leakage of carbon dioxide back to the surface thus defeating the reason for sequestration. Large scale implantation of carbon dioxide sequestration will be significantly limited without thickening of the supercritical carbon dioxide for more effective mobility control and ultimately higher carbon dioxide storage capacity in formations.

In the recovery of hydrocarbons, such as oil or natural gas, from subterranean hydrocarbon-bearing formations or reservoirs, it is usually possible to recover only a limited proportion of the original hydrocarbons present in the reservoir by primary recovery methods that utilize the natural formation pressure to produce the hydrocarbons through suitable production wells. A variety of supplementary recovery techniques have therefore evolved to maintaining formation pressure or improve hydrocarbon displacement. Water flooding, often enhanced with polymers and surfactants, is one method but can come at an environmental cost "Miscible flooding" is another common supplementary recovery technique to improve hydrocarbon displacement.

In the production of hydrocarbons, such as oil or natural gas, from subterranean hydrocarbon-bearing formations or reservoirs, a fluid, often water, is injected into the formation to fracture the formation and release the hydrocarbons therein. However, much of the fluid becomes trapped and remains in the formation, resulting in a high consumption of the fluid resource, among other environmental risks. The use of carbon dioxide as a fracturing fluid could help to reduce the use of other fluids, namely water, and the impacts of such use, as well as provide a convenient repository for excess carbon dioxide.

Miscible flooding involves introducing fluids into a formation that are miscible with the hydrocarbon to be displaced. One such fluid is carbon dioxide. Carbon dioxide is considered a miscible-type flooding agent because under supercritical conditions, usually high pressure, carbon dioxide acts as a solvent. However, the low viscosity of supercritical carbon dioxide can limit (or affect or diminish) its ability to sweep the oil that is targeted for enhanced recovery to the producing well (or zone). Thus, the use of carbon dioxide is limited without thickening significantly for more effective mobility control and ultimately higher production rates.

The idea of thickening carbon dioxide with polymers is known in the art, from, for example, Heller, J. P. et al., "Direct Thickeners for Mobility of $CO_2$ Floods." *Soc. Pet. Eng. J.* 1985, 25, 679-686.

Further, Zhang, S. et al. (2013). Effects of polymers as direct CO2 thickeners on the mutual interactions between a light crude oil and CO2. *J Polym. Res.*, 20(61). pp. 1-13 teaches the use of poly(vinyl ethyl ether) ("PVEE") and a low molecular weight (~900 Mw) poly(1-decene) ("P1D") as effective thickeners for carbon dioxide.

The ability to increase carbon dioxide viscosity by a few times to an order of magnitude with environmentally friendly and cost-efficient thickening systems is key to using carbon dioxide for hydrocarbon production and recovery and sequestration and a pursuit of global oil and gas companies.

SUMMARY OF THE INVENTION

The disclosed technology solves the problem of thickening of carbon dioxide compositions in an efficient and environmentally friendly manner by adding to the composition a branched polyolefin polymer that increases the viscosity of supercritical carbon dioxide.

The disclosed technology thus provides a carbon dioxide composition including a major amount of carbon dioxide and at least one branched polyolefin polymer that can increase the viscosity of supercritical carbon dioxide.

The branched polyolefin polymer can be polymerized from a $C_2$ to $C_{24}$ olefin or mixture thereof. For example, the branched polyolefin polymer can be a polyisobutylene polymer.

The branched polyolefin polymer may also be polymerized from $C_3$ to $C_{24}$ α-olefins, or mixtures thereof. For example, the branched polyolefin polymer can be a polydecene polymer.

Preferably, the polyolefin polymer can have a number average molecular weight of from 140 to 5000 as measured by gel permeation chromatography with polystyrene standard.

The branching of the branched polyolefin polymer can include at least one of an aromatic hydrocarbyl group, aliphatic hydrocarbyl group, cyclic hydrocarbyl group, and mixtures thereof. In particular, the branching of the branched polyolefin polymer can include a hydroxyl containing aromatic group. The branching of the branched polyolefin polymer can also include an amine containing aromatic group.

The carbon dioxide composition can contain the branched polyolefin polymer at from 0.01 to 5 wt. % based on the weight of the composition.

The disclosed technology also include a method to increase the production of hydrocarbons from an underground hydrocarbon containing formation. The method includes injecting into the formation a carbon dioxide composition as described above, and recovering released hydrocarbons from the hydrocarbon containing formation.

The disclosed technology also includes a method of sequestering carbon dioxide. The method include injecting into a formation a carbon dioxide composition as described above.

The disclosed technology also includes a method of increasing the viscosity of supercritical carbon dioxide. The method includes adding to carbon dioxide a thickener. The thickener is at least one branched polyolefin polymer that increases the viscosity of supercritical carbon dioxide.

DETAILED DESCRIPTION OF THE INVENTION

Various preferred features and embodiments will be described below by way of non-limiting illustration.

Composition

The compositions herein will include carbon dioxide. Carbon dioxide consists of two oxygen atoms covalently bonded to a single carbon atom. Carbon dioxide can exist as a solid, liquid, gas, or, at temperatures above its critical point, as a supercritical fluid. Supercritical fluids are those that exhibit properties of both liquids, such as the ability to dissolve other substances, and of gases, such as the ability to effuse through solids. As a supercritical fluid, carbon dioxide has the ability to mix homogeneously, or in other words is miscible with, hydrocarbons, such as crude oil, and can therefore improve the recovery of such hydrocarbons.

The carbon dioxide composition will also include at least one branched polyolefin polymer. Polyolefins are well known in the art. In one embodiment, the polyolefin employed in the carbon dioxide composition may be derivable (or derived) from olefins with 2 to 24 carbon atoms.

As used herein, the term "olefin" refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be straight-chain, branched-chain or cyclic. "Olefin" is intended to embrace all structural isomeric forms of olefins, unless it is specified to mean a single isomer or the context clearly indicates otherwise.

By derivable or derived it is meant the polyolefin is polymerized from the starting polymerizable olefin monomers having the noted number of carbon atoms or mixtures thereof. In embodiments, the polyolefin employed in the carbon dioxide composition may be derivable (or derived) from olefins with 3 to 24 carbon atoms. In some embodiments, the polyolefin employed in the carbon dioxide composition may be derivable (or derived) from olefins with 4 to 24 carbon atoms. In further embodiments, the polyolefin employed in the carbon dioxide composition may be derivable (or derived) from olefins with 5 to 20 carbon atoms. In still further embodiments, the polyolefin employed in the carbon dioxide composition may be derivable (or derived) from olefins with 6 to 18 carbon atoms. In still further embodiments, the polyolefin employed in the carbon dioxide composition may be derivable (or derived) from olefins with 8 to 14 carbon atoms. In alternate embodiments, the polyolefin employed in the carbon dioxide composition may be derivable (or derived) from olefins with 8 to 12 carbon atoms.

As used herein, the term "carbon backbone" of a polyolefin is defined as the straight carbon chain therein having the largest number of carbon atoms.

As used herein, the term "branching group" with respect to a polyolefin refers to any group other than hydrogen attached to the carbon backbone of the polyolefin, other than those attached to the carbon atoms at the very ends of the carbon backbone.

Often the polymerizable olefin monomers comprise one or more of propylene, isobutene, 1-butene, isoprene, 1,3-butadiene, or mixtures thereof.

An example of a useful polyolefin is polyisobutylene.

Polyolefins also include poly-α-olefins derivable (or derived) from α-olefins. As used herein, the term "alpha-olefin" refer to an olefin having a terminal carbon-to-carbon double bond (($R^1R^2$)—C=$CH_2$) in the structure thereof. As used herein, "polyalpha-olefin(s)" ("PAO(s)") includes any oligomer(s) and polymer(s) of one or more alpha-olefin monomer(s). PAOs are oligomeric or polymeric molecules produced from the polymerization reactions of alpha-olefin monomer molecules in the presence of a catalyst system, optionally further hydrogenated to remove residual carbon-carbon double bonds therein. Thus, the PAO can be a dimer, a trimer, a tetramer, or any other oligomer or polymer comprising two or more structure units derived from one or more alpha-olefin monomer(s). The PAO molecule can be highly regio-regular, such that the bulk material exhibits an isotacticity, or a syndiotacticity when measured by $^{13}C$ NMR. The PAO molecule can be highly regio-irregular, such that the bulk material is substantially atactic when measured by $^{13}C$ NMR. A PAO material made by using a metallocene-based catalyst system is typically called a metallocene-PAO ("mPAO"), and a PAO material made by using traditional non-metallocene-based catalysts (e.g., Lewis acids, supported chromium oxide, and the like) is typically called a conventional PAO ("cPAO"). The poly-α-olefins used herein may be mPAOs. The poly-α-olefins used herein may also be cPAOs.

The α-olefins may be linear or branched or mixtures thereof. Examples include mono-olefins such as propylene, 1-butene, isobutene, 1-pentene, 1-hexene, 1-heptene, 1-octene, 1-nonene, 1-decene, etc. Other examples of α-olefins include 1-decene, 1-undecene, 1-dodecene, 1-tridecene, 1-tetradecene, 1-pentadecene, 1-hexadecene, 1-heptadecene 1-octadecene, and mixtures thereof. Other examples of α-olefins include 1-nonadecene, 1-eicosene, 1-heneicosene, 1-docosene, 1-tricosene, 1-tetracosene in yet another embodiment. Preferred LAO feeds are 1-hexene, 1-octene, 1-decene, 1-dodecene, 1-tetradecene, 1-hexadecene and 1-octadecene. Examples of preferred α-olefin mixtures as monomers for making the poly-α-olefins include, but are not limited to: C6/C8; C6/C10; C6/C12; C6/C14; C6/C16; C6/C8/C10; C6/C8/C12; C6/C8/C14; C6/C8/C16; C8/C10; C8/C12; C8/C14; C8/C16; C8/C10/C12; C8/C10/C14; C8/C10/C16; C10/C12; C10/C14; C10/C16; C10/C12/C14; C10/C12/C16; and the like. An example of a useful α-olefin is 1-decene.

An example of a useful poly-α-olefin is poly-decene.

The polyolefin may also be a copolymer of at least two different olefins, also known as an olefin copolymer (OCP). These copolymers are preferably copolymers of α-olefins having from 2 to about 28 carbon atoms, preferably copolymers of ethylene and at least one α-olefin having from 3 to about 28 carbon atoms, typically of the formula CH$_2$=CHR$_1$ wherein R$_1$ is a straight chain or branched chain alkyl radical comprising 1 to 22 carbon atoms. Preferably R$_1$ in the above formula can be an alkyl of from 1 to 8 carbon atoms, and more preferably can be an alkyl of from 1 to 2 carbon atoms.

The composition may be substantially free of ethylene and polymers thereof. The composition may be completely free of ethylene and polymers thereof. By substantially free, it is meant that the composition contains less than of the given material. In some embodiments, substantially free means less than 0.005 wt. % of the given material. Substantially free can also mean less than 1000 ppm of the given material. In some embodiments, substantially free means less than 500 ppm of the given material. Substantially free can also mean less than 250 ppm of the given material. In some embodiments, substantially free means less than 100 ppm of the given material. Substantially free can also mean less than 50 ppm of the given material. In some embodiments, substantially free means less than 30 ppm of the given material. Substantially free can also mean less than 10 ppm, or less than 5 ppm, or even less than 1 ppm of the given material. The composition may be substantially free of propylene and polymers thereof. The composition may be completely free of propylene and polymers thereof.

The polyolefin polymers prepared from the aforementioned olefin monomers can have a number average molecular weight of from 140 to 5000. The polyolefin polymers prepared from the aforementioned olefin monomers can also have a number average molecular weight of from 200 to 4750. The polyolefin polymers prepared from the aforementioned olefin monomers can also have a number average molecular weight of from 250 to 4500. The polyolefin polymers prepared from the aforementioned olefin monomers can also have a number average molecular weight of from 500 to 4500. The polyolefin polymers prepared from the aforementioned olefin monomers can also have a number average molecular weight of from 750 to 4000 as measured by gel permeation chromatography with a polystyrene standard.

Some of the polyolefins will include branching by virtue of the structure of the polymer. For example, the polymerization of α-olefins along the α bond results in the tails of these monomers branching along the polymerized α olefin. The longer the α-olefin, the longer the branches off of the resultant polyolefin. Polydecene for example can result in a polymer having branches of 8 carbon atoms.

A typical, hydrogenated PAO molecule can be represented by the following formula I:

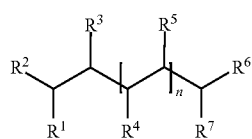

I where R$^1$, R$^2$, R$^3$, each of R$^4$ and R$^5$, R$^6$, and R$^7$, the same or different at each occurrence, independently represents a hydrogen or a substituted or unsubstituted hydrocarbyl (preferably an alkyl) group, and n is an non-negative integer corresponding to the degree of polymerization.

Thus, where n=0, formula I represents a dimer produced from the reaction of two monomer molecules after a single addition reaction between two carbon-carbon double bonds.

Where n=m, m being a positive integer, formula I represents a molecule produced from the reactions of m+2 monomer molecules after m+1 steps of addition reactions between two carbon-carbon double bonds.

Thus, where n=1, formula I represents a trimer produced from the reactions of three monomer molecules after two steps of addition reactions between two carbon-carbon double bonds.

Assuming a straight carbon chain starting from R$^1$ and ending with R$^7$ has the largest number of carbon atoms among all straight carbon chains existing in formula I, then the straight carbon chain starting from R$^1$ and ending with R$^7$ having the largest number of carbon atoms constitutes the carbon backbone of the poly-α-olefin molecule formula I. R$^2$, R$^3$, each of R$^4$ and R$^5$, and R$^6$, which can be substituted or unsubstituted hydrocarbyls (preferably alkyl) groups, are branching groups (if not hydrogen).

If only alpha-olefin monomers are used in the polymerization process, and no isomerization of the monomers and oligomers ever occurs in the reaction system during polymerization, about half of R$^1$, R$^2$, R$^3$, all R$^4$ and R$^5$, R$^6$, and R$^7$ would be hydrogen, and one of R$^1$, R$^2$, R$^6$, and R$^7$ would be a methyl, and about half of groups R$^1$, R$^2$, R$^3$, all R$^4$ and R$^5$, R$^6$, and R$^7$ would be hydrocarbyl groups introduced from the alpha-olefin monomer molecules. In a specific example of such case, assuming R$^2$ is methyl, R$^3$, all R$^5$, and R$^6$ are hydrogen, and R$^1$, all R$^4$, and R$^7$ have 8 carbon atoms in the longest carbon chains contained therein, and n=8, then the carbon backbone of the formula I PAO molecule would comprise 35 carbon atoms, and the average branching group length of the branching groups (R$^2$, all of R$^4$) would be 7.22 (i.e., (1+8*8)/9).

This PAO molecule, which can be produced by polymerizing 1-decene using certain metallocene catalyst systems described in greater detail below, can be represented by formula II below:

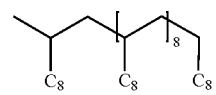

Depending on the polymerization catalyst system used, however, different degrees of isomerization of the monomers and/or oligomers can occur in the reaction system during the polymerization process, resulting in different degrees of substitution on the carbon backbone. In a specific example of such case, assuming R$^2$, R$^3$, all R$^5$ are methyls, and R$^6$ is hydrogen, le has 8 carbon atoms in the longest straight carbon chain contained therein, and all R$^4$ and R$^7$ have 7 carbon atoms in the longest straight carbon chain contained therein, and n=8, then the carbon backbone of the formula I PAO molecule would comprise 34 carbon atoms, and the average branching group length of the branching groups (R$^2$, all R$^4$, and R$^5$) would be 3.67 (i.e., (1+1+7*8+1*8)/18). This PAO molecule, which may be produced by polymerizing 1-decene using certain non-metallocene catalyst systems described in greater detail below, can be represented by the following formula III:

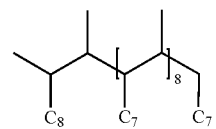

PAO base stocks useful for the present invention may be a homopolymer made from a single alpha-olefin monomer or a copolymer made from a combination of two or more alpha-olefin monomers.

The branching groups on the PAO molecules can be straight chain alkyls having at least 6 carbon atoms. The branching groups on the PAO molecules can be straight chain alkyls having at least 8 carbon atoms.

In one embodiment, there is provided a 1000 to 5000 molecular weight branched PAO polymer, such as a polydecene polymer. The branched PAO polymer, such as polydecene, can also have a number average molecular weight of from 1250 to 4750. The branched PAO polymer, such as polydecene, can also have a number average molecular weight of from 1500 to 4500. The branched PAO polymer, such as polydecene, can have a number average molecular weight of from 2000 to 4250. The branched PAO polymer, such as polydecene, can also have a number average molecular weight of from 2500 to 4000 as measured by gel permeation chromatography with a polystyrene standard.

The polyolefins may also be functionalized with substituents to add branching along the polyolefin backbone. For example, the polyolefin may be functionalized with at least one of an aromatic hydrocarbyl group, aliphatic hydrocarbyl group, cyclic hydrocarbyl group, and mixtures thereof, so that the branching of the branched polyolefin polymer includes at least one of an aromatic hydrocarbyl group, aliphatic hydrocarbyl group, cyclic hydrocarbyl group, and mixtures thereof.

In some embodiments, the polyolefin may be functionalized with at least one aromatic hydrocarbyl group so that the branching of the branched polyolefin polymer includes at least one aromatic hydrocarbyl group. The aromatic hydrocarbyl group may be, for example, a hydroxyl containing aromatic group, such as, for example, a phenol group, an amine containing aromatic group, such as, for example, aniline, and mixtures thereof. Other aromatic groups can include, for example, phenylmethylene; o-heptyl-phenylmethylene; and p-heptylphenylmethylene; aniline and alkyl anilines; indole and alkyl indoles; quinoline and alkyl quinoline; isoquinoline and alkyl isoquinoline; pyrazine and alkyl pyrazine; quinoxaline and alkyl quinoxaline; acridine and alkyl acridine; pyrimidine and alkyl pyrimidine; quinazoline and alkyl quinazoline. The aromatic group can also be a polyaromatic group, such as, for example, naphthalene, naphthol or other homologues of phenol with fused aromatic rings, naphthylamine or other homologues of aniline.

In an embodiment, the aromatic group is a hydroxyl containing aromatic group.

In an embodiment, the aromatic group is a phenol group. In an embodiment, the aromatic group is an amine containing aromatic group. In an embodiment, the aromatic group is a hydroxyl and amine containing aromatic group. In an embodiment, the aromatic group is a 2-((dimethylamino)methyl)phenol group.

In some embodiments, the polyolefin may be functionalized with at least one
aliphatic hydrocarbyl group, so that the branching of the branched polyolefin polymer includes at least one aliphatic hydrocarbyl group.

In some embodiments, the polyolefin may be functionalized with at least one cyclic hydrocarbyl group, so that the branching of the branched polyolefin polymer includes at least one cyclic hydrocarbyl group. An example cyclic group includes, for example, cyclohexylmethylene. Other cyclic groups can include heterocyclic groups, such as, for example, pyridines and alkyl pyridines, pyrrole and alkyl pyrroles, piperidine and alkyl piperidines, pyrrolidine and alkyl pyrrolidines, imidazole and alkyl imidazole. Other cyclic groups can include, in particular, vinyl-pyridine and/or vinylimidazole, as well as styrene.

In some embodiments, the polyolefin can be a polyisobutylene polymer with a number average molecular weight from 140 to 5000. The polyisobutylene polymer can also have a number average molecular weight of from 200 to 4500. The polyisobutylene polymer can also have a number average molecular weight of from 250 to 4000. The polyisobutylene polymer can have a number average molecular weight of from 300 to 3500. The polyisobutylene polymer can have a number average molecular weight of from 350 to 3000. The polyisobutylene polymer can also have a number average molecular weight of from 400 to 2500 as measured by gel permeation chromatography with a polystyrene standard.

The carbon dioxide composition can include the branched polyolefin polymer at from 0.01 to 5 wt. % based on the weight of the composition. The carbon dioxide composition may include the branched polyolefin polymer at from 0.05 to 4.5 wt. % based on the weight of the composition. The carbon dioxide composition may also include the branched polyolefin polymer at from 0.1 to 4 wt. % based on the weight of the composition. The carbon dioxide composition could also include the branched polyolefin polymer at from 0.5 to 3.5 wt. % based on the weight of the composition.

One purpose of the polyolefin polymer is to increase the viscosity of supercritical carbon dioxide. The absolute viscosity of supercritical carbon dioxide will vary depending on the temperature and pressure at which the viscosity is measured, but has been seen to be about 0.07 cP at 2000 psi and 0.09 cP at 2900 psi as measured by viscometer. The polyolefin polymer can be dosed into the supercritical carbon dioxide to increase the viscosity of the composition relative to the starting supercritical carbon dioxide viscosity, up to the point at which the supercritical carbon dioxide becomes un-flowable.

In some embodiments, the polyolefin polymer can be dosed into the carbon dioxide composition to increase the relative viscosity of the composition by at least 100% which can also be referenced as 2 times or "2×;" meaning the absolute viscosity of the carbon dioxide composition is 100% greater than the absolute viscosity of the supercritical carbon dioxide on its own. For example, if the absolute viscosity of the supercritical carbon dioxide is 0.05, a relative viscosity 100% greater would be 0.05+(0.05)*100%=0.01, or 2 times. In some embodiments, the polyolefin polymer can be dosed into the carbon dioxide composition to increase the relative viscosity of the composition from about 100% to about the point at which the composition does not flow freely, such as about 1 or 2 or 3 or 3.5 or 4 or 4.5 or 5 orders of magnitude and more.

As used herein "order of magnitude" means approximately a factor of 10. In some embodiments, the polyolefin polymer can be dosed into the carbon dioxide composition to increase the relative viscosity of the composition by at least 150% which can also be referenced as 2.5 times or "2.5×." In some embodiments, the polyolefin polymer can be dosed into the carbon dioxide composition to increase the relative viscosity of the composition from about 150% to about the point at which the composition does not flow freely, such as about 1 or 2 or 3 or 3.5 or 4 or 4.5 or 5 orders of magnitude and more. In some embodiments, the polyolefin polymer can be dosed into the carbon dioxide composition to increase the relative viscosity of the composition by at least 200%, which can also be referenced as 3 times or "3×." In some embodiments, the polyolefin polymer can be dosed into the carbon dioxide composition to increase the relative viscosity of the composition from about 200% to about the point at which the composition does not flow freely, such as about 1 or 2 or 3 or 3.5 or 4 or 4.5 or 5 orders of magnitude and more. In some embodiments, the polyolefin polymer can be dosed into the carbon dioxide composition to increase the relative viscosity of the composition by at least 250% or 3.5×. In some embodiments, the polyolefin polymer can be dosed into the carbon dioxide composition to increase the relative viscosity of the composition from about 250% to about the point at which the composition does not flow freely, such as about 1 or 2 or 3 or 3.5 or 4 or 4.5 or 5 orders of magnitude and more. In some embodiments, the polyolefin polymer can be dosed into the carbon dioxide composition to increase the relative viscosity of the composition by at least 300% or 4×. In some embodiments, the polyolefin polymer can be dosed into the carbon dioxide composition to increase the relative viscosity of the composition from about 300% to about the point at which the composition does not flow freely, such as about 1 or 2 or 3 or 3.5 or 4 or 4.5 or 5 orders of magnitude and more.

Given the temperatures and pressures involved with obtaining supercritical carbon dioxide, measurements of absolute viscosity are difficult and may provide slightly differing results from well to well. However, when comparing viscosity between two samples out of the same well by the same measurement method (i.e., viscosity of supercritical carbon dioxide to viscosity of carbon dioxide composition containing the polyolefin polymer) the relative viscosity trends should be the same or similar between methods. Thus, the relative viscosity numbers herein may be arrived at by measure of the absolute viscosity of the comparable samples by any reasonable test method. One method may be to employ a viscometer.

One useful measure to screen polyolefin polymers can be to check the solubility of the polymer in supercritical carbon dioxide. In general, the more soluble a second substance is in a first substance, the more available the second substance is to act on the first substance. While complete solubility is desired, a partially soluble polymer can also provide viscosity improvements. The solubility of the polymer can be measured by methods known in the art, such as, for example, by visual inspection or cloud point. In an embodiment, the solubility of the polyolefin polymer in the carbon dioxide composition can be measured by a sapphire rocking cell test. The sapphire rocking cell test employs an apparatus having two rocking cells generally of about 20 mL volume, each equipped with a stainless steel ball to aid agitation. Each cell is charged with a designated volume of the chosen branched polyolefin polymer and injected with carbon dioxide to a desired supercritical carbon dioxide pressure. The cells are then submerged in a constant temperature water bath. The cells are rocked in the water bath from a 45° angle to a −45° angle at a pre-determined rocking frequency, for example, 15 times/min. The water bath is brought to the desired temperature and the sapphire cells are observed for solubility of the polyolefin polymer in the supercritical carbon dioxide. If the polyolefin is completely soluble in the supercritical carbon dioxide at the given pressure and temperature, the supercritical mixture will appear homogeneous. Otherwise, separate phases will be observed in the cells.

In some cases, the pressure actually necessitated for solubility of the hydrocarbons in the supercritical carbon dioxide could depend upon the minimum miscibility pressure (MMP) of the hydrocarbons present. The MMP may be found by simple experiment, using samples of the hydrocarbons from the reservoir and the carbon dioxide composition, which anyone skilled in the art would be readily able to perform.

Method

An aspect of the disclosed technology is the use of branched polyolefin polymers to thicken carbon dioxide. Thus, the technology provides a method of increasing the viscosity of supercritical carbon dioxide. The method can include adding to carbon dioxide a thickener. The thickener is at least one branched polyolefin polymer that increases the viscosity of supercritical carbon dioxide. The method can further include pressurizing the carbon dioxide composition at a temperature to cause the formation of supercritical carbon dioxide.

The carbon dioxide composition described herein can be employed to sequester carbon dioxide in an underground formation, as well as to recover hydrocarbons from an underground hydrocarbon containing formation.

Hydrocarbons can be recovered from an underground hydrocarbon containing formation or reservoir by injecting a solvent (carbon dioxide in this case) into the reservoir through an injection well and recovering hydrocarbon containing fluids from a production well which is at a horizontal distance or offset from the injection well. In practice, more than one injection well and more than one production well may be used and these may be arranged in a number of different patterns suitable for solvent drive operations of this kind. For simplicity, however, the present invention is described below with reference only to a single injection well and a single production well.

The carbon dioxide composition as described herein should be injected under sufficient pressure so that under the conditions which prevail in the reservoir, the carbon dioxide in the composition is present as a dense phase, that is, it is under supercritical conditions and present neither as a liquid or a dense vapor. Generally, this will be achieved by maintaining pressure in the reservoir sufficiently high to maintain the carbon dioxide in the required dense phase state, i.e. at a density greater than approximately 0.468 g cm$^{-3}$. This pressure, in itself, increases with increasing reservoir temperature and the pressure should therefore be chosen in accordance with reservoir temperature. The method of viscosity increase discussed herein can be employed at pressures of 500 psia or greater, such as up to 10,000 psia, or for example 750 to 6000 psia. Typical minimum pressures for maintaining the dense phase state are 900 psia at 85° F., 1200 psia at 100° F., 1800 psia at 150° F., 2500 psia at 200° F. and 3100 psia at 250° F. (6205 kPa at 30° C., 8275 kPa at 38° C., 12410 kPa at 65° C., 17235 kPa at 93° C. and 21375 kPa at 120° C.).

Thus, the method of recovering hydrocarbons from an underground hydrocarbon containing formation can involve at least some, if not all, of the following steps, not necessarily in the following order:

determining the temperature and pressure of the hydrocarbon formation;

optionally, screening for a suitable branched polyolefin polymer by, for example, either determining the solubility of the at least one branched polyolefin polymer at the temperature and pressure encountered in the formation, which may be done, for example, by performing the sapphire rocking cell test, or determining the MMP of the hydrocarbons present;

selecting the at least one branched polyolefin polymer;

injecting into the hydrocarbon formation a carbon dioxide composition containing carbon dioxide and the at least one branched polyolefin polymer; and recovering released hydrocarbons from the hydrocarbon containing formation.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing nonhydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, amino, and sulfoxy);

hetero substituents, that is, substituents which, while having a predominantly hydrocarbon character, in the context of this invention, contain other than carbon in a ring or chain otherwise composed of carbon atoms and encompass substituents as pyridyl, furyl, thienyl and imidazolyl. Heteroatoms include sulfur, oxygen, and nitrogen. In general, no more than two, or no more than one, nonhydrocarbon substituent will be present for every ten carbon atoms in the hydrocarbyl group; alternatively, there may be no nonhydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

Sample 1—un-hydrogenated decene dimer of 280 number average molecular weight

Sample 2—un-hydrogenated metallocene poly-decene of 2300 number average molecular weight Sample 3—un-hydrogenated metallocene poly-decene of 2900 number average molecular weight Sample 4—polyolefin phenol derived from polyisobutylene of 590 number average molecular weight Sample 5—polyolefin phenol derived from polyisobutylene of 950 number average molecular weight Sample 6—Mannich reaction product of sample 5 and dimethylamine Sample 7—reaction product of polyisobutylene succinic anhydride and aromatic amine Sample 8—reaction product of polyisobutylene succinic anhydride, maleinated ethylene/propylene copolymer and aromatic amine Sample 9—reaction product of maleinated ethylene/propylene copolymer and aromatic amine Sample 10—maleinated product of sample 2

Sample 11—reaction product of Sample 10 and polyethylene polyamine

Sample 12—polyisobutylene of 2700 number average molecular weight

Sample 13—polyisobutylene of 2060 number average molecular weight

Sample 14—polyisobutylene of 1000 number average molecular weight

Sample 15—polyisobutylene of 1000000 number average molecular weight

Each of Samples 1 to 15 were tested for solubility in carbon dioxide in the sapphire rocking cell test. The designated weight of Sample polymer was charged into two separate rocking cells containing 20 mL carbon dioxide, each cell containing a stainless steel ball to aid agitation. The cells were charged to 2500 psi and then submerged in a constant temperature water bath at 35° C. The cells were rocked in the water bath from a 45° angle to a −45° angle at a rocking frequency of 15 times/min and observed for solubility of the Sample polymer in the supercritical carbon dioxide. If the Sample was soluble, the supercritical mixture appeared homogeneous. Otherwise, separate phases were observed in the cells.

| | Solubility of polymer at specific concentration with respect to $CO_2$ at 2500 psi, 35° C. | | | | | |
|---|---|---|---|---|---|---|
| | Polymer/wt. % in $CO_2$ | | | | | |
| | 0.5 | 0.75 | 1 | 1.5 | 1.75 | 2 |
| Sample 1 | — | — | No | No | — | — |
| Sample 2 | Yes | Yes | Yes | Yes | — | — |
| Sample 3 | Yes | Yes | Yes | No | — | — |
| Sample 4 | — | — | Yes | Yes | Yes | Yes |
| Sample 5 | — | — | Yes | Yes | Yes | No |
| Sample 6 | Yes | — | Yes | No | — | No |
| Sample 7 | No | — | — | — | — | No |
| Sample 8 | No | — | — | — | — | No |
| Sample 9 | No | — | — | — | — | No |
| Sample 10 | No | — | — | — | — | No |
| Sample 11 | No | — | Yes | No | — | No |
| Sample 12 | No | — | No | — | — | — |
| Sample 13 | No | — | No | — | — | — |
| Sample 14 | No | — | No | — | — | — |
| Sample 15 | No | — | No | — | — | — |

"—" means not tested

A ViscoPro2100 moving piston viscometer unit was used to measure the viscosity of blends of each of the samples with carbon dioxide. The viscometer unit was connected in line with the rocking cell setup. There were 2 cells with valves, and as both valves were opened, the mixture of $CO_2$ and Sample polymer was passed from the rocking cell setup to the viscometer. The ViscoPro 2100 viscometer consists of a sensor in which a piston is moved from one end of the sensor to the other with the help of electromagnetic coils. The sensor also consists of a temperature probe. Once solubility of a Sample polymer in $CO_2$ was achieved in the rocking cell, the valve connecting the rocking cell to the viscometer was opened, allowing the fluid to pass into the viscometer sensor. Temperature control was achieved in the lines connecting the viscometer and rocking cell setup with the help of heating bands. Real time readings of viscosity and temperature of the fluid in the sensor were provided. The results of the measurements and the pressures at which each measurement was taken are provided in the table below.

| Polymer | wt. % in $CO_2$ | Viscosity (cP) | Relative viscosity |
|---|---|---|---|
| 2000 psi | | | |
| Blank | — | 0.07 | 1 |
| Sample 3 | 1 | 0.32 | 4.5 |
| Sample 4 | 1 | 0.16 | 2.2 |
| Sample 5 | 1 | 0.2 | 2.8 |
| 2500 psi | | | |
| Blank | — | 0.08 | 1 |
| Sample 1 | 0.75 | 0.17 | 2.1 |
| Sample 2 | 1 | 0.21 | 2.6 |
| Sample 3 | 1 | 0.39 | 4.9 |
| Sample 4 | 1 | 0.2 | 2.5 |
| Sample 5 | 1 | 0.24 | 3 |
| Sample 6 | 1 | 0.24 | 3 |
| Sample 7 | 1 | * | 1 |
| Sample 10 | 1 | * | 1.6 |
| Sample 14 | 1 | * | 1.5 |
| 2900 psi | | | |
| Blank | — | 0.09 | 1 |
| Sample 3 | 1 | 0.45 | 5.1 |

*complete single phase was not achieved

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

There is provided a carbon dioxide composition comprising a major amount of carbon dioxide and at least one branched polyolefin polymer.

The composition of any sentence in any previous paragraph, wherein the composition has a relative viscosity at least 100% greater than supercritical carbon dioxide. The composition of any sentence in any previous paragraph, wherein the composition has a relative viscosity at least 150% greater than supercritical carbon dioxide. The composition of any sentence in any previous paragraph, wherein the composition has a relative viscosity at least 200% greater than supercritical carbon dioxide. The composition of any sentence in any previous paragraph, wherein the composition has a relative viscosity at least 300% greater than supercritical carbon dioxide.

The composition of any sentence in any previous paragraph, wherein the composition has a relative viscosity from about 100% to about 1 orders of magnitude. The composition of any sentence in any previous paragraph, wherein the composition has a relative viscosity from about 100% to about 2 orders of magnitude. The composition of any sentence in any previous paragraph, wherein the composition has a relative viscosity from about 100% to about 3 orders of magnitude. The composition of any sentence in any previous paragraph, wherein the composition has a relative viscosity from about 100% to about 3.5 orders of magnitude. The composition of any sentence in any previous paragraph, wherein the composition has a relative viscosity from about 100% to about 4 orders of magnitude. The composition of any sentence in any previous paragraph, wherein the composition has a relative viscosity from about 100% to about 5 orders of magnitude. The composition of any sentence in any previous paragraph, wherein the composition has a relative viscosity from about 150% to about 5 orders of magnitude. The composition of any sentence in any previous paragraph, wherein the composition has a relative viscosity from about 150% to about 4 orders of magnitude. The composition of any sentence in any previous paragraph, wherein the composition has a relative viscosity from about 150% to about 3 orders of magnitude. The composition of any sentence in any previous paragraph, wherein the composition has a relative viscosity from about 200% to about 5 orders of magnitude. The composition of any sentence in any previous paragraph, wherein the composition has a relative viscosity from about 200% to about 4 orders of magnitude. The composition of any sentence in any previous paragraph, wherein the composition has a relative viscosity from about 200% to about 3 orders of magnitude. The composition of any sentence in any previous paragraph, wherein the composition has a relative viscosity from about 250% to about 5 orders of magnitude. The composition of any sentence in any previous paragraph, wherein the composition has a relative viscosity from about 250% to about 4 orders of magnitude. The composition of any sentence in any previous paragraph, wherein the composition has a relative viscosity from about 250% to about 3 orders of magnitude. The composition of any sentence in any previous paragraph, wherein the composition has a relative viscosity from about 300% to about 5 orders of magnitude. The composition of any sentence in any previous paragraph, wherein the composition has a relative viscosity from about 300% to about 4 orders of magnitude. The composition of any sentence in any previous paragraph, wherein the composition has a relative viscosity from about 300% to about 3 orders of magnitude.

The composition of any sentence in any previous paragraph, wherein the polyolefin polymer has a number average molecular weight of from 140 to 5000 as measured by gel permeation chromatography with polystyrene standard. The composition of any sentence in any previous paragraph, wherein the polyolefin polymer has a number average molecular weight of from 200 to 4750 as measured by gel permeation chromatography with polystyrene standard. The composition of any sentence in any previous paragraph, wherein the polyolefin polymer has a number average molecular weight of from 250 to 4500 as measured by gel permeation chromatography with polystyrene standard. The composition of any sentence in any previous paragraph, wherein the polyolefin polymer has a number average molecular weight of from 500 to 4500 as measured by gel permeation chromatography with polystyrene standard. The composition of any sentence in any previous paragraph, wherein the polyolefin polymer has a number average molecular weight of from 750 to 4000 as measured by gel permeation chromatography with polystyrene standard. The composition of any sentence in any previous paragraph, wherein the polyolefin polymer has a number average molecular weight of from 1000 to 5000 as measured by gel permeation chromatography with polystyrene standard.

The composition of any sentence in any previous paragraph, wherein the at least one branched polyolefin polymer is polymerized from a C2-C24 olefin or mixture thereof. The composition of any sentence in any previous paragraph, wherein the at least one branched polyolefin polymer is polymerized from a C3-C24 olefin or mixture thereof. The composition of any sentence in any previous paragraph, wherein the at least one branched polyolefin polymer is polymerized from a C4-C24 olefin or mixture thereof. The composition of any sentence in any previous paragraph, wherein the at least one branched polyolefin polymer is polymerized from a C5-C20 olefin or mixture thereof. The composition of any sentence in any previous paragraph, wherein the at least one branched polyolefin polymer is polymerized from a C6-C18 olefin or mixture thereof. The composition of any sentence in any previous paragraph, wherein the at least one branched polyolefin polymer is polymerized from a C8-C14 olefin or mixture thereof. The composition of any sentence in any previous paragraph, wherein the at least one branched polyolefin polymer is polymerized from a C8-C12 olefin or mixture thereof.

The composition of any sentence of any previous paragraph, wherein the branched polyolefin polymer comprises a propylene polymer. The composition of any sentence of any previous paragraph, wherein the branched polyolefin polymer comprises an isobutene polymer. The composition of any sentence of any previous paragraph, wherein the branched polyolefin polymer comprises a 1-butene polymer. The composition of any sentence of any previous paragraph, wherein the branched polyolefin polymer comprises an isoprene polymer. The composition of any sentence of any previous paragraph, wherein the branched polyolefin polymer comprises a 1,3-butadiene polymer. The composition of any sentence of any previous paragraph, wherein the branched polyolefin polymer comprises a polyisobutylene polymer.

The composition of any sentence of any previous paragraph, wherein the branched polyolefin polymer comprises a polyisobutylene polymer having a number average molecular weight from 140 to 5000. The composition of any sentence of any previous paragraph, wherein the branched polyolefin polymer comprises a polyisobutylene polymer having a number average molecular weight of from 200 to 4500. The composition of any sentence of any previous paragraph, wherein the branched polyolefin polymer comprises a polyisobutylene polymer having a number average molecular weight of from 250 to 4000. The composition of any sentence of any previous paragraph, wherein the branched polyolefin polymer comprises a polyisobutylene polymer having a number average molecular weight of from 300 to 3500. The composition of any sentence of any previous paragraph, wherein the branched polyolefin polymer comprises a polyisobutylene polymer having a number average molecular weight of from 350 to 3000. The composition of any sentence of any previous paragraph, wherein the branched polyolefin polymer comprises a polyisobutylene polymer having a number average molecular weight of from 400 to 2500 as measured by gel permeation chromatography with a polystyrene standard The composition of any sentence of any previous paragraph, wherein the at least one branched polyolefin polymer is polymerized from C4-C24 α-olefin or mixture thereof. The composition of any sentence of any previous paragraph, wherein the at least one branched polyolefin polymer is polymerized from 1-pentene. The composition of any sentence of any previous paragraph, wherein the at least one branched polyolefin polymer is polymerized from 1-hexene. The composition of any sentence of any previous paragraph, wherein the at least one branched polyolefin polymer is polymerized from 1-heptene. The composition of any sentence of any previous paragraph, wherein the at least one branched polyolefin polymer is polymerized from 1-octene. The composition of any sentence of any previous paragraph, wherein the at least one branched polyolefin polymer is polymerized from 1-nonene. The composition of any sentence of any previous paragraph, wherein the at least one branched polyolefin polymer is polymerized from 1-decene. The composition of any sentence of any previous paragraph, wherein the at least one branched polyolefin polymer is polymerized from 1-decene. The composition of any sentence of any previous paragraph, wherein the at least one branched polyolefin polymer is polymerized from 1-undecene. The composition of any sentence of any previous paragraph, wherein the at least one branched polyolefin polymer is polymerized from 1-dodecene. The composition of any sentence of any previous paragraph, wherein the at least one branched polyolefin polymer is polymerized from 1-tridecene. The composition of any sentence of any previous paragraph, wherein the at least one branched polyolefin polymer is polymerized from 1-tetradecene. The composition of any sentence of any previous paragraph, wherein the at least one branched polyolefin polymer is polymerized from 1-pentadecene. The composition of any sentence of any previous paragraph, wherein the at least one branched polyolefin polymer is polymerized from 1-hexadecene. The composition of any sentence of any previous paragraph, wherein the at least one branched polyolefin polymer is polymerized from 1-heptadecene. The composition of any sentence of any previous paragraph, wherein the at least one branched polyolefin polymer is polymerized from 1-octadecene. The composition of any sentence of any previous paragraph, wherein the at least one branched polyolefin polymer is polymerized from 1-nonadecene.

The composition of any sentence of any previous paragraph, wherein the at least one branched polyolefin polymer is polymerized from 1-eicosene. The composition of any sentence of any previous paragraph, wherein the at least one branched polyolefin polymer is polymerized from 1-heneicosene. The composition of any sentence of any previous paragraph, wherein the at least one branched polyolefin polymer is polymerized from 1-docosene. The composition of any sentence of any previous paragraph, wherein the at least one branched polyolefin polymer is polymerized from 1-tricosene. The composition of any sentence of any previous paragraph, wherein the at least one branched polyolefin polymer is polymerized from 1-tetracosene.

The composition of any sentence of any previous paragraph, wherein the branched polyolefin polymer comprises a 1000 to 5000 Mn polydecene polymer as measured by gel permeation chromatography with a polystyrene standard. The composition of any sentence of any previous paragraph, wherein the branched polyolefin polymer comprises a 1250 to 4750 Mn polydecene polymer as measured by gel permeation chromatography with a polystyrene standard. The composition of any sentence of any previous paragraph, wherein the branched polyolefin polymer comprises a 1500 to 4500 Mn polydecene polymer as measured by gel permeation chromatography with a polystyrene standard. The composition of any sentence of any previous paragraph, wherein the branched polyolefin polymer comprises a 2000 to 4250 Mn polydecene polymer as measured by gel permeation chromatography with a polystyrene standard. The composition of any sentence of any previous paragraph, wherein the branched polyolefin polymer comprises a 2500 to 4000 Mn polydecene polymer as measured by gel permeation chromatography with a polystyrene standard.

The composition of any sentence of any previous paragraph, wherein the branched polyolefin polymer comprises mixtures of any of the polymers in the preceding sentences. The composition of any sentence of any previous paragraph, wherein the branched polyolefin polymer comprises mixtures of C6 and C8 α-olefin. The composition of any sentence of any previous paragraph, wherein the branched polyolefin polymer comprises mixtures of C6 and C10 α-olefin. The composition of any sentence of any previous paragraph, wherein the branched polyolefin polymer comprises mixtures of C6 and C12 α-olefin. The composition of any sentence of any previous paragraph, wherein the branched polyolefin polymer comprises mixtures of C6 and C14 α-olefin. The composition of any sentence of any previous paragraph, wherein the branched polyolefin polymer comprises mixtures of C6 and C16 α-olefin. The composition of any sentence of any previous paragraph, wherein the branched polyolefin polymer comprises mixtures of C6, C8 and C10 α-olefin. The composition of any sentence of any previous paragraph, wherein the branched polyolefin polymer comprises mixtures of C6, C8 and C12 α-olefin. The composition of any sentence of any previous paragraph, wherein the branched polyolefin polymer comprises mixtures of C6, C8 and C14 α-olefin. The composition of any sentence of any previous paragraph, wherein the branched polyolefin polymer comprises mixtures of C6, C8 and C16 α-olefin. The composition of any sentence of any previous paragraph, wherein the branched polyolefin polymer comprises mixtures of C8 and C10 α-olefin. The composition of any sentence of any previous paragraph, wherein the branched polyolefin polymer comprises mixtures of C8 and C12 α-olefin. The composition of any sentence of any previous paragraph, wherein the branched polyolefin polymer comprises mixtures of C8 and C14 α-olefin. The composition of any sentence of any previous paragraph, wherein the branched polyolefin polymer comprises mixtures of C8 and C16 α-olefin. The composition of any sentence of any previous paragraph, wherein the branched polyolefin polymer comprises mixtures of C8, C10 and C12 α-olefin. The composition of any sentence of any previous paragraph, wherein the branched polyolefin polymer comprises mixtures of C8, C10 and C14 α-olefin. The composition of any sentence of any previous paragraph, wherein the branched polyolefin polymer comprises mixtures of C8, C10 and C16 α-olefin. The composition of any sentence of any previous paragraph, wherein the branched polyolefin polymer comprises mixtures of C10 and C12 α-olefin. The composition of any sentence of any previous paragraph, wherein the branched polyolefin polymer comprises mixtures of C10 and C14 α-olefin. The composition of any sentence of any previous paragraph, wherein the branched polyolefin polymer comprises mixtures of C10 and C16 α-olefin. The composition of any sentence of any previous paragraph, wherein the branched polyolefin polymer comprises mixtures of C10, C12 and C14 α-olefin. The composition of any sentence of any previous paragraph, wherein the branched polyolefin polymer comprises mixtures of C10, C12 and C16 α-olefin.

The composition of any sentence of any previous paragraph, wherein the branching of the branched polyolefin polymer comprises an aromatic hydrocarbyl group. The composition of any sentence of any previous paragraph, wherein the branching of the branched polyolefin polymer comprises a hydroxyl containing aromatic group. The composition of any sentence of any previous paragraph, wherein branching of the branched polyolefin polymer comprises an amine containing aromatic group. The composition of any sentence of any previous paragraph, wherein the branching of the branched polyolefin polymer comprises an aliphatic hydrocarbyl group. The composition of any sentence of any previous paragraph, wherein the branching of the branched polyolefin polymer comprises a cyclic hydrocarbyl group. The composition of any sentence of any previous paragraph, wherein the branching of the branched polyolefin polymer comprises mixture of any of the foregoing hydrocarbyl groups.

The composition of any sentence of any previous paragraph, wherein the branching of the branched polyolefin polymer is substantially free of, or free of, succinimide or succinic anhydride functionality.

The composition of any sentence of any previous paragraph, comprising from 0.01 to 5 wt. % of the branched polyolefin polymer based on the weight of the composition. The composition of any sentence of any previous paragraph, comprising from 0.05 to 4.5 wt. % of the branched polyolefin polymer based on the weight of the composition. The composition of any sentence of any previous paragraph, comprising from 0.1 to 4 wt. % of the branched polyolefin polymer based on the weight of the composition. The composition of any sentence of any previous paragraph, comprising from 0.5 to 3.5 wt. % of the branched polyolefin polymer based on the weight of the composition.

A method to increase the production of hydrocarbons from an underground hydrocarbon containing formation comprising injecting into the formation a composition as claimed in any sentence of any previous paragraph, and recovering released hydrocarbons from said hydrocarbon containing formation.

A method of increasing the viscosity of supercritical carbon dioxide comprising adding to the carbon dioxide a thickener comprising at least one branched polyolefin polymer that increases the relative viscosity of the combination of the carbon dioxide and thickener at least 100% compared to supercritical carbon dioxide.

The method of the previous paragraph wherein the viscosity is increased at a pressure between 500 and 10,000 psi and temperatures between 30 C and 120 C. The method of the previous paragraph wherein the viscosity is increased at a pressure between 750 and 6,000 psi and temperatures between 30 C and 120 C.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A carbon dioxide composition comprising a major amount of carbon dioxide and a polydecene polymer having a number average molecular weight of from 1500 to 5000 as measured by gel permeation chromatography with polystyrene standard.

2. The composition of claim 1, comprising from 0.01 to 5 wt. % of the polydecene polymer based on the weight of the composition.

3. The carbon dioxide composition of claim 2, wherein the composition has a relative viscosity at least 100% greater than supercritical carbon dioxide.

4. The composition of claim 3, comprising from 0.5 to 5 wt. % of the polydecene polymer based on the weight of the composition.

5. The composition of claim 1, comprising from 0.5 to 5 wt. % of the polydecene polymer based on the weight of the composition.

\* \* \* \* \*